Nov. 9, 1926.
1,606,384
M. H. ROBERTS
RAILWAY BOOSTER
Filed March 14, 1924    4 Sheets-Sheet 4
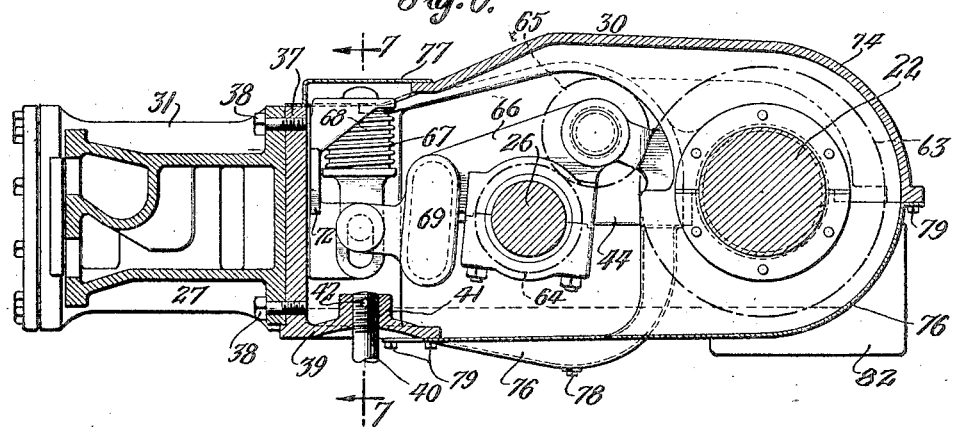
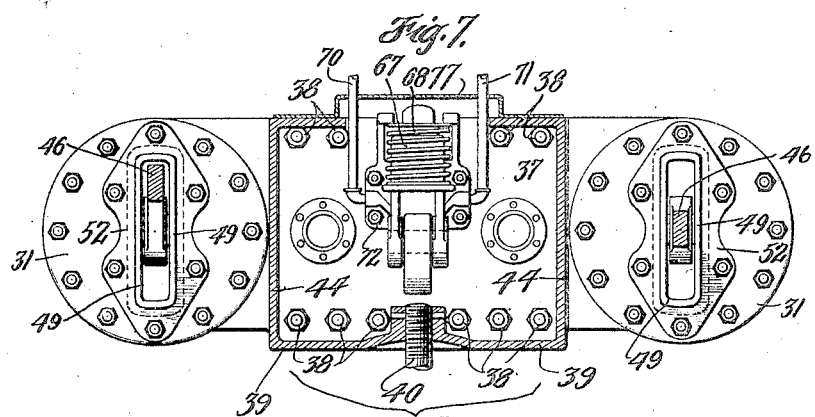
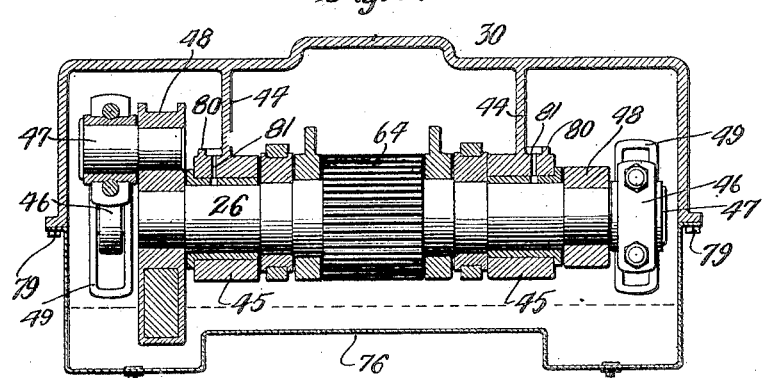
INVENTOR.
Montague H. Roberts
BY
ATTORNEYS.

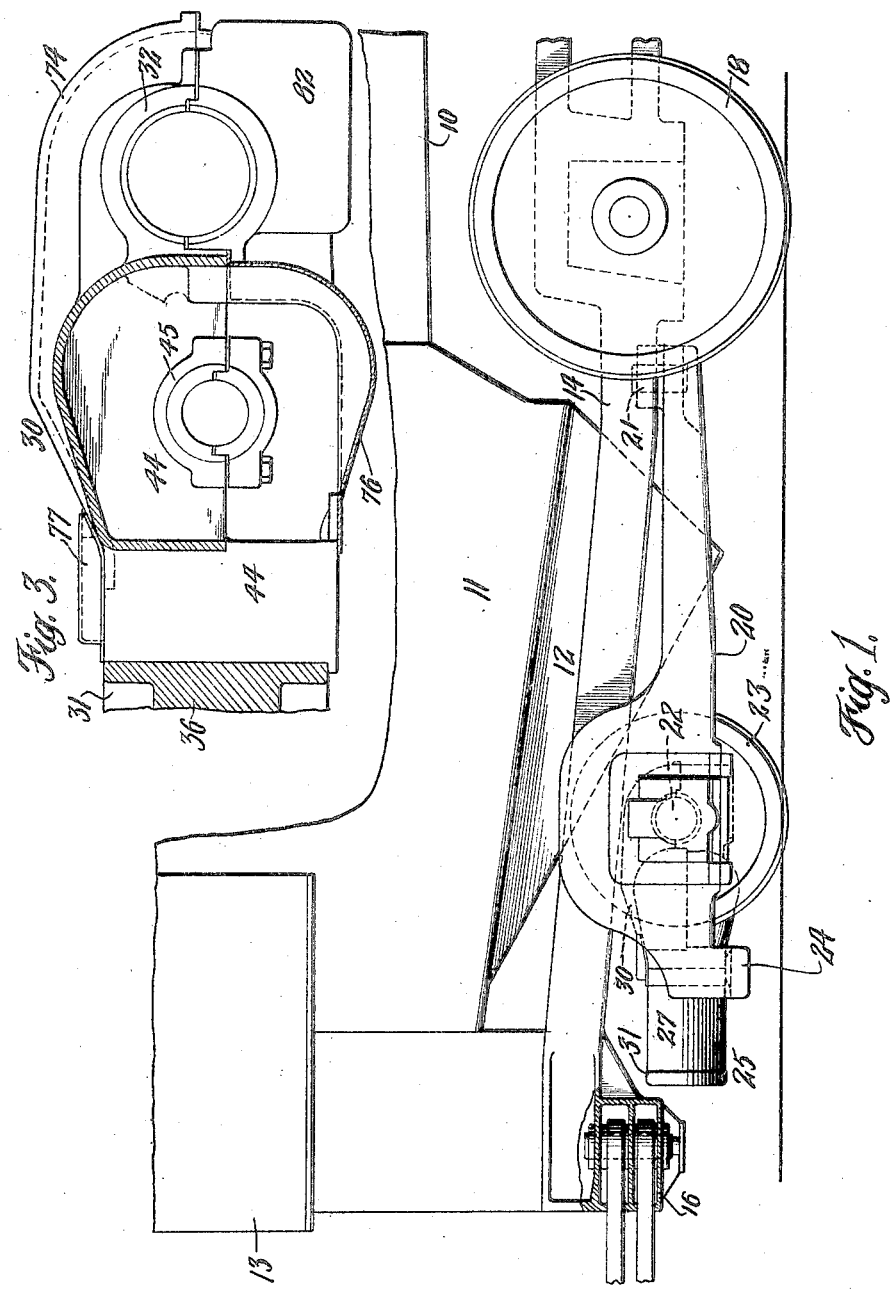

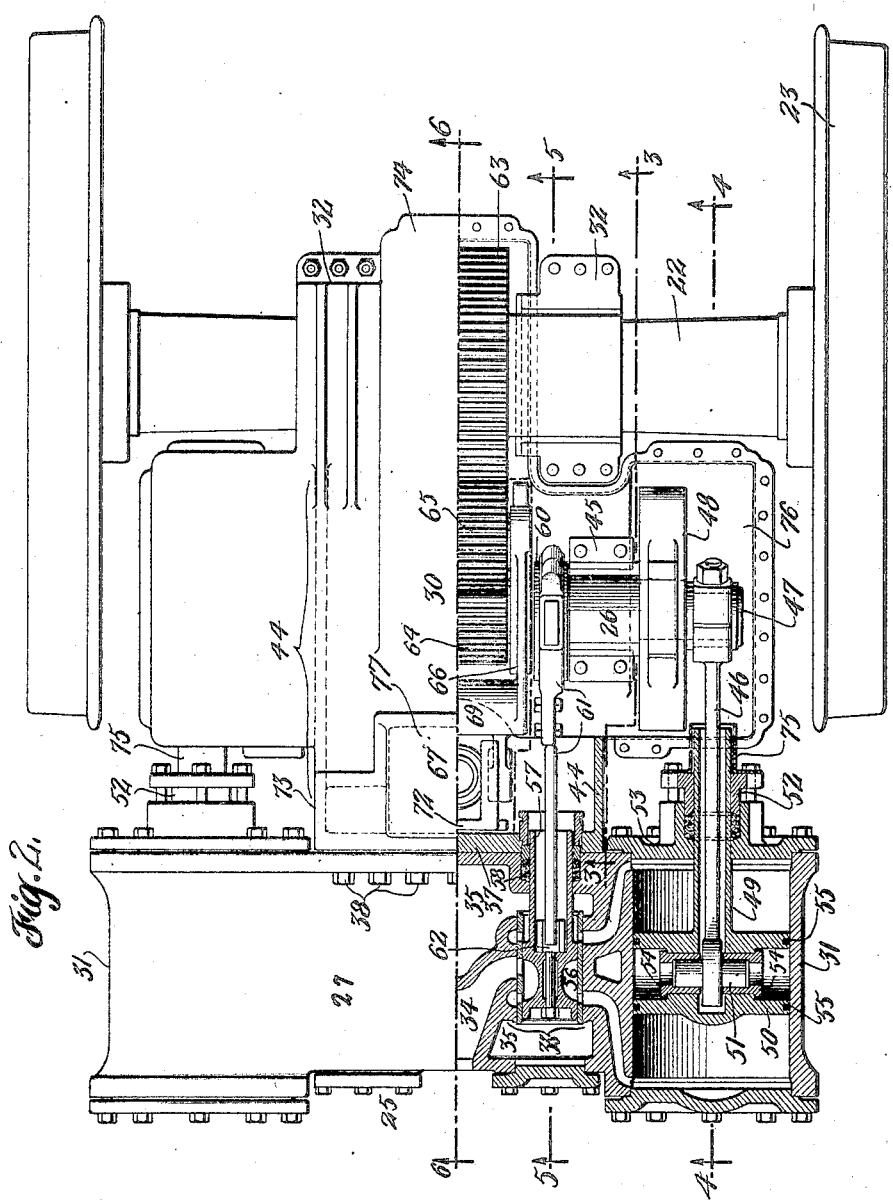

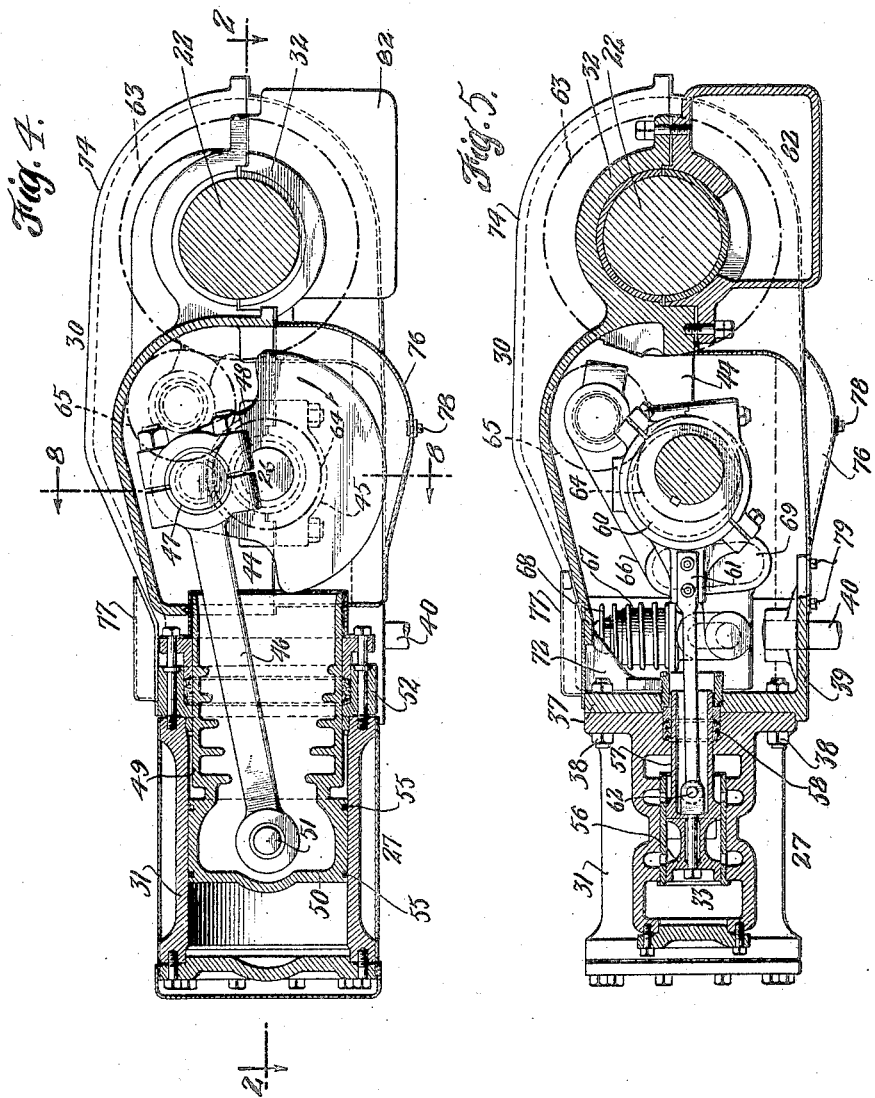

Patented Nov. 9, 1926.

1,606,384

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, OF NEW YORK, N. Y., A CORPORATION OF DELAWARE.

RAILWAY BOOSTER.

Application filed March 14, 1924. Serial No. 699,209.

This invention relates to railway boosters, and to booster equipped locomotives. Its aim is to improve the application of boosters to locomotives, and the behavior of the latter as affected thereby; and also to improve the booster itself in various ways.

Boosters such as here referred to commonly consist of a couple of horizontal reciprocating engines mounted on a railway vehicle (especially on its truck), usually for for the purpose of assisting in its propulsion. For this purpose, the booster may be applied to an axle of a locomotive trailer truck,—or to any other suitable axle of the locomotive, of its tender, or of some other vehicle or car in a railway train. In general, such a booster serves to increase the tractive power in starting and at slow speeds, by making drivers of wheels which would otherwise merely help to sustain the deadweight. However, the booster is not ordinarily intended to drive the locomotive or the train by itself, or to operate at all at high speeds, or in backing; and provisions (which need not be described) are accordingly made for automatically disconnecting it when the steam supply to the locomotive is shut off, or when the speed exceeds a predetermined limit or when the locomotive is thrown into reverse gear,—as well, of course, as for enabling the engineer to connect and disconnect it at will under proper conditions.

The space available for a booster on a railway truck is necessarily very limited,— especially when the booster is mounted on the trailer truck of a locomotive, as in the more usual practice. Accordingly, notwithstanding every effort to build the booster just as short as possible fore and aft of the locomotive, and as narrow as possible transversely, the smallest dimensions heretofore consistent with realizing the desired booster power often encroach on space much needed for other locomotive parts or equipment: thus entailing disadvantageous locations for such parts (if not their omission altogether), or else preventing any application of boosters to locomotives of certain designs. In particular, the extension of the booster rearward from the trailer axle tends to interfere with a satisfactory location of a drawbar pocket,—either preventing equipment of locomotives with the "unit safety bar," (as it is termed) at all, or requiring the pocket and the drawbar pins to be located at the extreme rear end of the locomotive cradle casting, where they impose objectionable transverse stresses in rounding curves and negotiating cross overs. It is also difficult to provide proper clearance between the forward end of the booster and the superjacent ashpan, and between the sides of the booster and the adjacent flanges of the trailer wheels,—especially if it is desirable to leave room for brake mechanism at the rear of these wheels. And in the effort to keep the booster as short as possible fore and aft of the locomotive, it has been found necessary to make the booster connecting rods objectionably short,—which means excessive angularity of the connecting rods, excessive side thrust from them on the cross heads, and excessive vibration.

As heretofore constructed, boosters have had their operating parts and mechanism enclosed in a casing. The lower portion of such casing is a relatively strong, massive "bed-plate," embodying the main framing of the booster. The upper portion is of relatively light sheet metal, for the most part, and removable to afford access to the internal parts or "works." However, this mode of access is difficult and unsatisfactory, owing to the limited space between the booster and the adjacent body or other structure of the vehicle with which the booster is associated. Hence it is not infrequently necessary to dismount the booster for the sake of freer access.

It is the aim of the present invention to obviate one or all of these drawbacks. In the preferred type of embodiment hereinafter described, convenient access to the operating parts is provided from beneath, without necessity for dismounting the booster; the booster as a whole is so compact as to be easily accommodated in the space available when it is mounted on the trailer truck of a locomotive, without any interference with other parts, or with their location to best advantage; the crank and connecting rod ratio is quite favorable, and the side thrust low; lubrication is effected more easily and reliably than heretofore; and various other special advantages are realized. The booster is stronger, simpler, and lighter than heretofore, and more reliable in operation.

In the drawings, Fig. 1 is a fragmentary side view of the rear portion of a locomotive, illustrating the application of a booster to its trailer truck in accordance with the present invention, and showing the drawbar pocket in vertical section.

Fig. 2 is a plan view of the booster and the associated trailer axle and wheels, on a larger scale than Fig. 1: and in the lower half of this figure various parts appear in horizontal section as indicated by the line 2—2 in Fig. 4.

Figs. 3, 4, 5 and 6 show vertical fore and aft sections through the booster casing and other parts, taken as indicated by the correspondingly numbered lines in Fig. 2.

Figs. 7 and 8 show vertical transverse sections taken as indicated by the correspondingly numbered lines in Fig. 6 and 4 respectively.

Fig. 1 shows the rear lower portion of the locomotive boiler 10 and its firebox 11, with ashpan 12, cab indicated at 13, frame 14, and double or "unit safety" drawbar 15, with pocket 16 on the cradle casting at the rear of the frame. One of the drive wheels 18 also appears. The trailer truck 20 is shown below the firebox 11, with frame pivoted to the locomotive frame 14 at 21, axle 22 beneath the ashpan 12, wheels 23, and with a transverse member or bolster 24 just outside of and closely adjacent its wheels, to the rear.

All these parts may be of any usual or preferred design and construction. They are shown in about their usual relative positions; except that the drawbar pocket 16 is not displaced rearward from the preferred position, as is often the case on booster-equipped locomotives, and the trailer axle 22 and wheels 23 are further to the rear than would be practicable with boosters heretofore known.

As shown most clearly in Figs. 1 and 2, the booster 25 is mounted about the trailer truck axle 22, which it is in the present instance intended to drive, and is also partly supported by the bolster member 24 of the truck frame. Like those heretofore used, the booster 25 comprises a transverse crankshaft 26 disconnectibly geared to the axle 22, and operated by a pair of double acting reciprocatory steam engines; and crankshaft, gearing, and other working parts are completely enclosed in a protective casing. This booster 25 is much shorter than any heretofore, however, so that notwithstanding the location of the axle 22 well to the rear (as mentioned), to give ample clearance above and ahead for the ashpan 12, there is also plenty of room behind the booster for mounting the deep "unit safety" drawbar pocket 16 in normal position. As shown, indeed, only the cylinder structure 27 of the booster 25 projects rearward beyond the transverse truck frame member 24.

Referring, now, more especially to Figs. 2, 3, 4, 5 and 6, the general construction and the mounting of the booster 25 will readily be understood. For supporting and protecting the operating parts, it has the frame and casing structure comprehensively indicated by the reference numeral 30. At one end of the structure 30 are the booster cylinders 31, 31, while at the other end said structure 30 has bearings 32, 32 for the axle 22, about which this structure 30 is thus mounted. In the present instance, the cylinders 31, 31, their valve chests 33, and the steam supply and exhaust passages 34, 35 are all in the transverse structure 27, which is attached to the structure 30. As shown the cylinders 31, 31 are at the outside of the structure 27, and the other parts mentioned in its intermediate portion. The cylinder structure 27 and the structure 30 need not be integral with one another: on the contrary, they may be formed separate and bolted together.

As shown, the structure 30 has an end wall 37 that lies against the mid-portion of the structure 27, and is secured thereto by rows of bolts 38 at top and bottom,—so as in effect to form part of the side wall of said structure 27, though also integrally attached to the fore and aft members 44, 44, etc., as hereinafter indicated. From the wall 37, a sort of bracket flange 39 projects toward the axle 22, to serve as a means of support for this end of the booster 25. A supporting stud-pin 40 for engaging the truck frame member 24 is mounted in a boss 41 on the flange 39, being screwed in and locked by a key 42. Thus, it will be seen, the weight of the booster 25 is transmitted to the supporting member 24 of the truck frame through the structure 27 and its lateral wall at 37. The frame structure 30 is spanned between the axle 22 and the member 24; and the axle bearings 32, 32 and the part 40 provide a sort of three point support for the booster 25 that freely accommodates all relative movements of axle and truck frame.

Preferably, the structure 30 has fore and aft strength members 44, 44 extending from the wall 37 to the axle bearings 32, 32 (Fig. 3). Besides an axle bearing 32, each strength member 44 carries one of the bearings 45 for the crankshaft 26. One half of each of these bearings may be integral with the member 44, while the other half may be a separate part bolted on, as usual in such cases. Each of the bearings 32, 45 may have the usual anti-friction lining. At and adjacent the wall 37, the fore and aft members 44, 44 are as wide as it is, and are united to the bracket member 39 at their lower edges, to brace it and afford greater strength;

but for the rest of their length, these members 44, 44 may be of less width (Figs. 2–8).

Instead of having the usual piston rods, cross-heads, etc., the booster engines here shown are of double acting "trunk" piston type, each with connecting rod 46 extending from the crank pin 47 of the overhung crank 48,—through a vertically elongated trunk 49 of the piston structure 50,—to a wrist pin 51 on (or in) the piston structure, and with stuffing box 52 on the crank end cylinder head 53 for the trunk 49. (Figs. 2, 4, and 7). This not only dispenses with the usual cross-head and cross-head guides, and allows the booster to be shortened (to cite actual designs) from about 76 in. overall (measured from the center of the driven axle to the outside of the far cylinder head) for the old type to 56 in. for the new type,—without any sacrifice of power,—but at the same time permits a crank and connecting rod ratio of about 1:5 for the new type as against about 1:3 for the old type. As shown, the connecting rods 46, 46 are located outside the members 44, 44.

Besides its direct advantages in economy of space already indicated, the shortening of the booster also allows its weight to be transmitted to the truck frame through the structure 27 as described above,—which obviates all need for a transverse strength member for this purpose interconnecting the fore and aft members 44, 44 at an intermediate point in their length, as was necessary in the old type. Various other advantages of all this (over and above the gain in space, the reduction in weight, and the simplification in construction) will appear hereinafter.

In the present instance, the wrist pin 51 is mounted in bushings 54 right in the center of the piston 50, between its packings 55, 55, so as to minimize the effects of the side thrust from the rod 46. (Fig. 2). In its reciprocation, the piston trunk 49 overlaps the orbit of revolution of the crank pin 47 on the outstroke: indeed, the crank and crank pin orbits come very close to the trunk stuffing box 52 (Figs. 2 and 4). The steam distribution valve 56 in each valve chest 33 is shown as a piston valve with cylindrical trunk 57 extending out through a stuffing box 58 in the wall at 37. (Figs. 2 and 5). As this valve 56 takes steam in the middle, at 34, and exhausts at the ends, at 35, there is little liability of objectionable leakage past the stuffing box 58 into the booster casing, and the unbalance due to the trunk 57 is slight.

Instead of being operated by a return crank on the main crank pin 47 and a cross shaft extending inward to a valve rod connection, as in the old type of booster, each valve 56 is actuated by an eccentric 60 on the crankshaft 26 just inside the bearing 45, and a direct connection comprising an eccentric strap and rod 61 extending rearward inside the strength member 44 and through the trunk 57 to a pivotal attachment 62 within the latter. This simplified operating connection for the valve is made easily practicable, of course, by getting rid of the usual transverse frame member interconnecting the members 44, 44 at an intermediate point in their length, as mentioned above.

The gearing for connecting the crankshaft 26 to the axle 22 is located in the central region of the booster casing, between the eccentrics 60, 60 and their valve actuating connections 61, 61. (Figs. 2, 4–6, and 8). It comprises a gear 63 on the axle 22, a pinion 64 on the crankshaft 26, and an idler pinion 65 mounted on a double rocker 66 fulcrumed on the crankshaft (Figs. 2 and 6). The idler pinion 65 is always in mesh with the crankshaft pinion 64 at their pitch lines, and is swung into and out of mesh with the axle gear 63 by a movable operating cylinder 67 and an opposing spring 68 and counterweight 69. Preferably, the rocker 66 is overbalanced some 30% toward a position out of mesh with the gear 63, to insure proper operation even if the spring 67 should break. To throw the gears 65, 63 into mesh and keep them in mesh, pressure from the booster control system (not shown) is admitted to the motor cylinder 67 through a pipe 70. (The pipe 71 shown is for conveying pressure from the cylinder 67 to other parts of the booster control system.) As shown, the gear operating motor 67 has a bracket frame 72, and is mounted on the wall 37 of the structure 27.

In the present instance, the booster casing (Figs. 2–8) is in the nature of a transverse crank case, with a lateral extension 73 from its mid-portion (where the eccentrics 60 and the pinions 64, 65 are located) rearward to the mid-portion of the structure 27, and another such extension 74 forward (between the axle bearings 32, 32) around the gear 63. Thus there is a central gearing and valve gear compartment between the members 44, 44, open fore and aft from the structure 27 to and beyond the bearings 32, 32. At either side, there are other compartments enclosing the crank orbits,—to the exclusion of the adjacent cylinder heads 53, 53 with their stuffing boxes 52, 52 and most of the space between crank orbits and cylinder heads, as well as of the axle bearings 32, 32. Preferably, the fore and aft walls of the crankcase extension 73 are formed by the wide ends of the strength members 44, 44. The rear walls of the lateral crankcase compartments have openings for the passage of the piston trunks 49, 49; and housing 75, 75 may be mounted on the stuffing boxes 52, 52, for protecting the trunks in the gaps.

In the old type of booster, the central space between the fore and aft frame members is not thus open, because of the necessity for a transverse member interconnecting them at the proper intermediate point in their length for transmitting the booster weight to the truck frame, as already explained.

Unlike that of the old type of booster, the framing of the construction here shown is arranged overhead, with the bearings 32, 45 at its lower side. As a result, not only is the lower portion of the booster casing left substantially free and unobstructed for purposes of lubrication; but (with the crankshaft 26 revolving clockwise, as indicated in Fig. 4) the side thrusts of the connecting rods 46, 46 on the crankshaft bearings 45, 45 are taken directly by the members 44, 44, instead of through the bolts securing the detachable halves of these bearings. In the present instance, also, the booster casing is in separable halves. The upper half is cast integral with the members 44, 44, 37, 39, as part of the structure 30; while the lower half consists of a separate sheet metal pan 76,—normally closing the bottom of the casing, but easily detachable and removable to afford free access from beneath to the booster mechanism. The top and side walls of the upper casing half serve to brace the fore and aft frame members 44, 44, and to strengthen the frame structure of the booster generally. As shown, there is an opening in the casing top, over the gear-operating motor 67, etc., with a removable sheet metal cover 77.

The lower casing half or pan 76 has shallow depressions beneath the cranks 48, 48, to afford ample clearance and serve as wells for lubricant; and at the low points of these depressions, there are drain plugs 78, 78 for drawing off the lubricant from the casing. This pan 76 closely resembles the top of the casing in configuration, extending fore and aft from the frame portion 39 beneath and up behind the axle gear 63, and transversely beyond and up outside either end of the crankshaft 26 (Figs. 2–6 and 8). The pan 76 may be secured to the upper casing half by bolts 79 extending through the flange at its upper edge and taking into the flange at the lower edge of the upper casing half. On top of each of the crankshaft bearings 45, 45, at the outer side of the corresponding member 44, there is cast an oil cup or catch-basin 80, with a duct 81 to the interior of the bearing. The axle bearings 32, 32 may have chambers 82, 82 in their lower halves, for containing oil and waste for lubricating these bearings by contact with the axle 22.

The general advantages of the type of booster above described over the old type—compactness, lightness, reduction in number of parts, general simplicity, and reliability—have already been indicated. It is further to be noted that the booster here shown can be lubricated very effectively and reliably by the mere splash action of the moving parts on a supply of lubricant in the casing,—which in practice serves as a reservoir, and is filled with oil up to about the dot and dash line in Figs. 4, 5, 6 and 8. Thus the gear 63 runs in the oil and supplies it to the pinions 64, 65 and their bearings, and to the eccentrics 60, 60,—both directly and by splash action. The cranks 48, 48, likewise, splash through the oil bath at every revolution; and thus the crank pins 47, 47 receive oil by direct immersion, while the oil cups 80, the crankshaft bearings 45, 45, the piston trunks 49, 49, and the wrist pins 51, 51 receive it as a result of the splashing. The lubrication of the trunks 49, 49, and of the wrist pins 51, 51 is particularly effective by reason of the fact that on their outward movement the trunks 49, 49 meet the splash from the oncoming crank counterweights,—which splash has free access to the interiors of the trunks, as shown in Fig. 4.

The advantages of the overhead type of booster framing here disclosed over the old construction will readily be appreciated,—as well as the fact that these advantages are by no means limited, of course, to a trunk piston type of booster. With the operating parts all mounted on the overhead frame structure, as here shown, it is a very easy matter to run the locomotive over a pit and remove the pan 76, thus obtaining free and convenient access to the interior of the booster casing between the axle 22 and the frame member 24, without any necessity for dismounting the booster. This, of course, is a very great practical advantage,—quite irrespective of whether the booster have trunk pistons or piston rods and cross heads.

1. The combination with a locomotive frame, drawbar, drawbar pocket beneath the frame, ashpan, and trailer truck with axle beneath said ashpan, of a trunk piston booster mounted about said axle, and lying beneath and behind said pan but ahead of the drawbar pocket.

2. The combination with a railway truck having a transverse member just outside its wheels, of a trunk piston booster mounted about their axle and supported by said member, with its cylinder structure resting on and projecting beyond the latter.

3. The combination with a railway truck and its axle, and a booster support on the truck frame, of a trunk piston booster comprising a frame structure mounted about the axle at one end, with a transverse structure at the other end thereof including the booster cylinders, and transmitting the weight of the booster to said booster support.

4. A trunk piston railway booster comprising a transverse crankshaft; cylinders; pistons with trunks overlapping the crank orbits on their outstrokes; and a crank case and frame structure attached to the cylinder structure and enclosing the crank orbits while affording passage for said piston trunks, but excluding and leaving open the space between crank orbits and adjacent cylinder heads.

5. A trunk piston railway booster comprising a transverse crankshaft, with gearing for driving a vehicle axle; cylinders; pistons with trunks overlapping the crankpin orbits on their outstrokes; and a crank case and frame structure enclosing cranks, crankshaft, and gearing with exclusion of the cylinder heads and the trunk stuffing boxes, and having a lateral extension to the cylinder structure for accommodating the gear operating means.

6. A trunk piston railway booster comprising a transverse crankshaft, and gearing between its cranks for driving a vehicle axle; a transverse cylinder structure with valves in its mid-portion; pistons with trunks overlapping the crank orbits on their outstrokes; a crank case and frame structure enclosing the crank orbits with exclusion of adjacent cylinder heads, but having a lateral extension from its mid-portion to said cylinder structure; and actuating connections extending from the crankshaft between its cranks and gearing to said valves, through the mid-portion of the crank case and its said lateral extension.

7. A trunk piston railway booster comprising a transverse crankshaft, cylinders, and a frame structure including fore and aft strength members attached to the cylinder structure and having bearings for a vehicle axle and for said crankshaft, with a compartment between said strength members open fore and aft from cylinder structure to axle bearings.

8. A trunk piston railway booster comprising a transverse crankshaft; a transverse cylinder structure with valves in its mid-portion; a frame structure including fore and aft strength members attached to said cylinder structure and having bearings for a vehicle axle and for said crankshaft; and actuating connections extending from crankshaft to valves between said strength members.

9. A trunk piston railway booster comprising a transverse crankshaft with counter weighted cranks; cylinders; pistons with trunks overlapping the crank orbits on their outstrokes; a frame structure attached to the cylinder structure and having bearings for said crankshaft; and a crank case affording a reservoir for a bath of lubricant in the path of the crank counterweights, so that the piston trunks shall be effectually lubricated by the splash of said counterweights.

10. A trunk piston railway booster engine comprising a transverse cylinder structure with valves in its mid-portion; a transverse crankshaft with gearing for disconnectibly driving a vehicle axle between its cranks, including a rocker carrying a shiftable gear; actuating connections extending from crankshaft to valves inside of the cranks and their connecting rods, at either side of said rocker; and an operating motor for said rocker also located directly between said connections.

11. A trunk piston railway booster comprising cylinders; a transverse crankshaft with gearing for disconnectibly driving a vehicle axle, including a rocker carrying a shiftable gear; and an operating motor for said rocker mounted on the side of the cylinder structure adjacent said crankshaft.

12. A trunk piston railway booster engine comprising a transverse crankshaft with gearing for disconnectibly driving a vehicle axle, and a gear operating motor mounted on the cylinder structure of said engine.

13. A railway booster comprising cylinders, and overhead frame structure for supporting the operating parts of the booster attached to said cylinders and having bearing for a vehicle axle to be driven by the booster.

14. The combination with a railway truck and its axle, and a booster support on the truck frame, of a booster with overhead supporting structure for its operating parts spanned between axle and truck frame support.

15. A railway booster comprising cylinders; a transverse crankshaft; overhead frame structure, with bearing for a vehicle axle, extending from axle to cylinders; and bearings for the crankshaft at the lower side of said frame structure, between axle bearing and cylinders.

16. The combination with a railway truck and its axle, and a booster support on the truck frame, of a booster comprising an overhead frame structure mounted about the axle at one end, with a transverse structure at the other end thereof including the booster cylinders and transmitting the weight of the booster to said booster support, and a transverse crankshaft mounted in bearings at the lower side of said frame structure.

17. The combination with a railway vehicle axle, of a booster comprising cylinders, an overhead frame structure mounted about the axle and attached to said cylinders, a transverse crankshaft mounted in bearings at the lower side of said frame structure, and disconnectible gearing between axle and crankshaft, including a rocker fulcrumed about said crankshaft carrying an idler gear meshing with a gear on the crankshaft and shiftable into and out of mesh with a gear on the axle.

18. A railway booster comprising trunk piston engines with overhead framing having bearing for a vehicle axle.

19. The combination with a railway truck having a transverse member outside its wheels, of a booster mounted about their axle and also supported by said member, with means for enclosing its mechanism including a bottom pan removable without dismounting the booster.

20. A railway booster comprising overhead frame and crank case structure, for supporting and protecting operating parts of the booster, and a detachable pan normally closing the bottom of the crank case, but when removed affording access to the operating parts.

21. The combination with a railway truck having a transverse member outside its wheels, of a booster with cylinder structure only projecting beyond said member, overhead frame and crank case structure spanned between the axle of said wheels and said transverse member, and a detachable pan normally closing the bottom of the crank case, but when removed affording free access thereto between transverse member and axle.

22. A railway booster comprising a transverse crankshaft, with gearing for driving a vehicle axle; overhead frame and crankcase structure, with bearing for said axle at one end; a transverse structure at the other end of said frame structure, including the booster cylinders and supporting means for transmitting the booster weight to the vehicle structure; and a pan for closing the bottom of the crankcase extending from said supporting means beneath the axle gearing.

23. A railway booster comprising trunk piston engines with overhead frame and crank case structure, and a pan for closing the bottom of the crank case removable to afford access to the booster mechanism from beneath.

In testimony whereof, I have hereunto signed my name.

MONTAGUE H. ROBERTS.